(12) United States Patent
Zilm (10) Patent No.: US 7,588,262 B1
(45) Date of Patent: Sep. 15, 2009

(54) HITCH SYSTEM FOR USE WITH A BALL HITCH AND METHODS THEREFORE

(76) Inventor: William M. Zilm, 0013 Laird La., Glenwood Springs, CO (US) 81601

( * ) Notice: Subject to any disclaimer, the term of this patent is extended or adjusted under 35 U.S.C. 154(b) by 0 days.

(21) Appl. No.: 12/098,327

(22) Filed: Apr. 4, 2008

(51) Int. Cl.
*B60T 7/12* (2006.01)
(52) U.S. Cl. ............... 280/432; 280/417.1; 280/441.2; 280/455.1
(58) Field of Classification Search ......... 280/432, 280/417.1, 441.2, 455.1, 901
See application file for complete search history.

(56) References Cited

U.S. PATENT DOCUMENTS

| | | | |
|---|---|---|---|
| 2,038,975 A | 4/1936 | Willetts | |
| 2,351,151 A | 6/1944 | Sattler | |
| 2,483,567 A * | 10/1949 | Vars | 280/474 |
| 2,761,699 A | 9/1956 | Martin | |
| 2,962,301 A | 11/1960 | Leinbach | |
| 3,059,795 A | 10/1962 | Schroeder | |
| 3,815,939 A * | 6/1974 | Pettay | 280/474 |
| 3,820,821 A | 6/1974 | Leland | |
| 3,823,961 A | 7/1974 | Korodi | |
| 3,861,716 A | 1/1975 | Baxter et al. | |
| 3,972,542 A | 8/1976 | Dirks et al. | |
| 4,068,860 A | 1/1978 | Meyers et al. | |
| 4,256,323 A | 3/1981 | McBride | |
| 4,611,968 A | 9/1986 | Casteel | |
| 4,832,358 A | 5/1989 | Bull | |
| 4,923,243 A | 5/1990 | Drahos | |
| 4,955,631 A | 9/1990 | Meyer | |
| 5,071,152 A | 12/1991 | Ducote | |
| 5,135,248 A | 8/1992 | Keiserman | |
| 5,890,728 A * | 4/1999 | Zilm | 280/433 |
| 6,050,588 A * | 4/2000 | Kissack | 280/511 |

(Continued)

FOREIGN PATENT DOCUMENTS

| | | |
|---|---|---|
| DE | 25 29 262 A | 1/1977 |
| EP | 0 332 328 | 6/1989 |
| GB | 827185 | 2/1960 |
| RU | 880848 | 11/1981 |

OTHER PUBLICATIONS

5th Aiborne, Sidewinder details, http://www.fifthairborne.com/sidewinder_details.html.
Trailer Gear, Quick Coupler Installation, http://www.trailergear.com/installation.html.
Related U.S. Appl. No. 11/939,468, filed Nov. 13, 2007, Inventor William M. Zilm.

*Primary Examiner*—Lesley D. Morris
*Assistant Examiner*—Maurice Williams
(74) *Attorney, Agent, or Firm*—Santangelo Law Offices, P.C.

(57) ABSTRACT

A hitch system for interconnecting a trailer to a tow vehicle, wherein the tow vehicle includes a hitch ball centered about a medial axis. The hitch system includes an elongate extension coupling having a proximal end portion rotatably mountable to the trailer and extending toward a distal end portion that is movably mountable to the hitch ball, and an anti-yaw mounting assembly for interfacing the extension coupling to the hitch ball such that the distal end portion is restricted from rotating about the medial axis.

15 Claims, 8 Drawing Sheets

U.S. PATENT DOCUMENTS

| | | |
|---|---|---|
| 6,186,530 B1 | 2/2001 | Zilm |
| 7,378,013 B2 * | 5/2008 | Sandler ...................... 280/507 |
| 2002/0060442 A1 * | 5/2002 | Andersen et al. ......... 280/416.1 |
| 2003/0173757 A1 * | 9/2003 | Smith ...................... 280/417.1 |
| 2003/0178811 A1 * | 9/2003 | Buckner .................... 280/483 |
| 2004/0070171 A1 * | 4/2004 | Freeman ................. 280/441.2 |

* cited by examiner

HITCH SYSTEM FOR USE WITH A BALL HITCH AND METHODS THEREFORE

BACKGROUND

Today's pickup truck is a very versatile vehicle that is used for work as well as play. Pickup trucks are particularly suited to the task of towing. Pickups are suitable for towing other vehicles, boats, campers, horse trailers, equipment and the like. In each of these applications a hitch is required to attach the load to the truck.

Several styles of hitches exist. Bumper mounted ball hitches are useful for lighter loads but for heavier loads the hitch is located in the bed of the pickup just above the rear axle. For instance, a popular style of bed mounted hitch system is known as a "gooseneck" hitch. A gooseneck hitch employs a ball and socket arrangement where the hitch ball is mounted in the bed of the pickup and the socket is part of the trailer. This arrangement is very common on horse trailers among others.

The substantial weight of a loaded gooseneck trailer requires proper loading and mounting of the hitch assembly. Where the typical pick-up truck is employed as the tow vehicle, the hitch ball is secured in the bed of the pick-up truck above and slightly in front of the rear axle. It is important that the mounting not be located too far forward of the axle to avoid unnecessary bending moments about the axle. Moreover, it is important not to mount the hitch ball rearwardly of the axle otherwise the tow vehicle will tend to rear off its front wheels resulting in loss of steering control.

Where a long-bed truck is employed as the tow vehicle, relatively few difficulties are encountered in the proper mounting of a hitch ball for a gooseneck trailer. Recently, though, the popularity of the short-bed pick-up truck has grown. Here, there is a decreased distance between the rear axle of the pick-up truck and the cab. In such cases, as discussed more thoroughly below, the proper mounting of the hitch ball results in an inadequate clearance distance between the forward portion of the trailer and the truck cab. In order to achieve adequate clearance, the tow hitch may be moved rearwardly in the bed, behind the rear axle. However, as noted above, this creates an undesirable and potentially dangerous towing configuration. Accordingly, there is a need for an alternative hitch system for interconnecting a trailer to a tow vehicle equipped with a gooseneck style hitch ball that provides enhanced trailer to cab clearance while maintaining the proper loading of the tow vehicle relative to its rear axle.

SUMMARY

Provided is a hitch system for interconnecting a trailer to a tow vehicle, wherein the tow vehicle includes a hitch ball centered about a medial axis. The hitch system includes an elongate extension coupling having a proximal end portion rotatably mountable to the trailer and extending toward a distal end portion that is movably mountable to the hitch ball, and an anti-yaw mounting assembly for interfacing the extension coupling to the hitch ball such that the distal end portion is restricted from rotating about the medial axis.

The distal end portion includes a slideway and the anti-yaw mounting assembly includes a restrictor sized and adapted to engage the slideway when the distal end portion is mounted to the hitch ball. The slideway extends upwardly to accommodate pitch and may thus be considered a pitch slideway, and may be configured arcuately to follow a contour of said distal end portion. The restrictor extends perpendicular to the medial axis thereby restricting rotation of the distal end portion about the medial axis when mounted to the hitch ball. Preferably, the restrictor is resiliently biased towards the hitch ball. The distal end portion includes a cavity for receiving the hitch ball and the anti-yaw mounting assembly is also operative to restrict the distal end portion from rotating about a vertical central axis of the cavity.

The hitch system may also include a locking assembly operatively connected to the extension coupling and movable between a locked state where the extension coupling can be securely coupled to the hitch ball, and an unlocked state where the extension coupling may be selectively decoupled from the hitch ball.

Preferably, the locking assembly is biased toward the locked state and includes a latch mechanism biased towards an unlatched state and movable to a latched state. The latch mechanism is operative to temporarily retain the locking assembly in the unlocked state. The latch mechanism is also adapted such that as the extension coupling is decoupled from the hitch ball the hitch ball unlatches the latch mechanism thereby allowing it to return to the unlatched state.

Also contemplated is an improvement in a towing application wherein a trailer that includes a downward extension having a central longitudinal axis is interconnected to a hitch ball disposed in a bed of a tow vehicle, wherein the hitch ball is centered about a medial axis. The improvement includes interconnecting the downward extension to the hitch ball such that the central longitudinal axis is displaced rearwardly of the hitch ball and restricting rotational movement of the downward extension about the medial axis while allowing rotational movement of the downward extension about the central longitudinal axis.

The improvement may also include interconnecting the downward extension to the hitch ball with an elongate extension coupling having a proximal end portion rotatably mountable to the downward extension and extending from the proximal end portion toward a distal end portion that is movably mountable to the hitch ball. The distal end portion has a vertical axis substantially parallel to the central longitudinal axis and rotational movement of the distal end portion about its vertical axis is restricted.

Also contemplated is a method of interconnecting a trailer to the hitch ball of a towing vehicle that includes displacing a pivotal axis of the trailer rearwardly of the hitch ball, rotatably mounting a proximal end portion of an extension coupling to the pivotal axis of the trailer, and movably mounting a distal end portion of the extension coupling to the hitch ball such that rotational movement of the distal end portion about the hitch ball is restricted in a plane substantially perpendicular to a medial axis of the hitch ball. The distal end portion includes a cavity for receiving the hitch ball. The method includes restricting movement of the distal end portion about a vertical central axis of the cavity while allowing pitch and roll movement of the distal end portion about the hitch ball.

Also contemplated is a method of decoupling a trailer from a hitch ball of a tow vehicle where the trailer includes a coupling having a locking assembly movable between a locked state wherein the trailer is securely coupled to the hitch ball, and an unlocked state wherein the trailer may be selectively decoupled from the hitch ball. The method includes moving the locking assembly toward the unlocked state, latching the locking assembly in the unlocked state, removing the trailer coupling from the hitch ball, and unlatching the locking assembly. Preferably, the hitch ball urges the locking assembly into the unlatched state as the trailer coupling is removed therefrom. The locking assembly is biased towards the locked state and the unlatched state.

DETAILED DESCRIPTION OF THE EXEMPLARY EMBODIMENT

The present invention is directed to the interconnection of a tow vehicle having a hitch ball to a trailer with an extension coupling that mounts to the trailer and includes a forwardly projecting elongated arm that has a proximal end pivotally connected to the trailer and a distal end that has a cavity for receiving the hitch ball. The invention particularly concerns a hitch system which interconnects the trailer to the tow vehicle while resisting rotation of the extension coupling relative to the hitch ball. The present invention is specifically useful for gooseneck trailers to be pulled by pick-up trucks. Accordingly, the present invention is described with respect to such a truck/trailer combination; however, it should be understood that the present invention may be used in other applications, as well.

Figure 1:
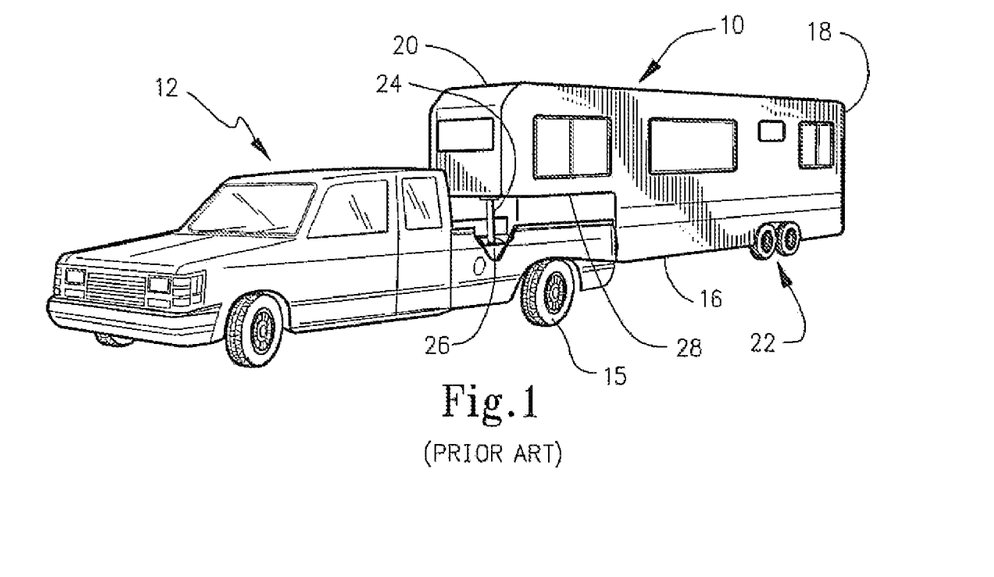
FIG. 1 is a perspective view of a goose neck trailer being towed by a tow vehicle having a short box bed according to the prior art.

As is generally shown in FIG. 1, it may be seen that a gooseneck trailer 10 is adapted to be towed by a tow vehicle in the form of a short bed pick-up truck 12 so that it may be moved along a roadway. Trailer 10 has a housing 16 having a rear portion 18 and a front portion 20. Rear portion 18 of housing 16 is supported on the surface of a roadway by means of a wheel set 22. Front portion 20 of housing 16 is connected to truck 12 and is supported thereby.

The traditional interconnection of a gooseneck trailer 10 to truck 12 is accomplished by a hitch ball, which is mounted in the bed 26 of truck 12. A downward extension 24 having a central longitudinal axis "A" depends from an underside 28 of front portion 20. The downward extension 24 includes a cavity for receiving the hitch ball. With this mounting, trailer 10 may rotate about axis "A," which is slightly forward of the rear axle of the tow vehicle 12.

It is important that the hitch ball be mounted as close to the rear axle of truck 12 as possible so as to allow the weight of trailer 10 to be supported directly above the axle. It is desirable, though, that the hitch ball be mounted slightly forward of the rear axle in order to diminish the likelihood that truck 12 will "rear" onto its back tires 15 with the front tires having diminished contact with the roadway or other support surface. The tendency of the vehicle to rear under heavy loads is substantially increased if the hitch ball is either mounted directly above or rearward of the rear axle of truck 12.

Figure 2:
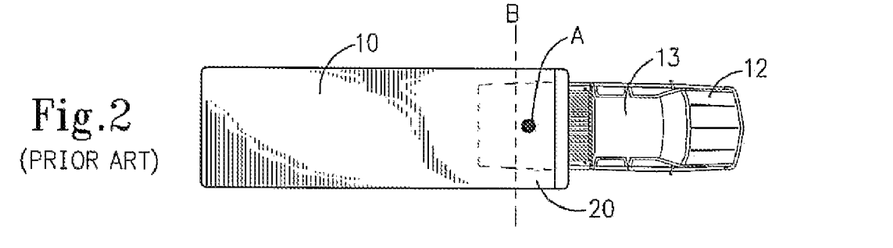
FIG. 2 is a top plan view of the prior art truck and trailer combination of FIG. 1 with the trailer being towed in a straight line.
Figure 3:
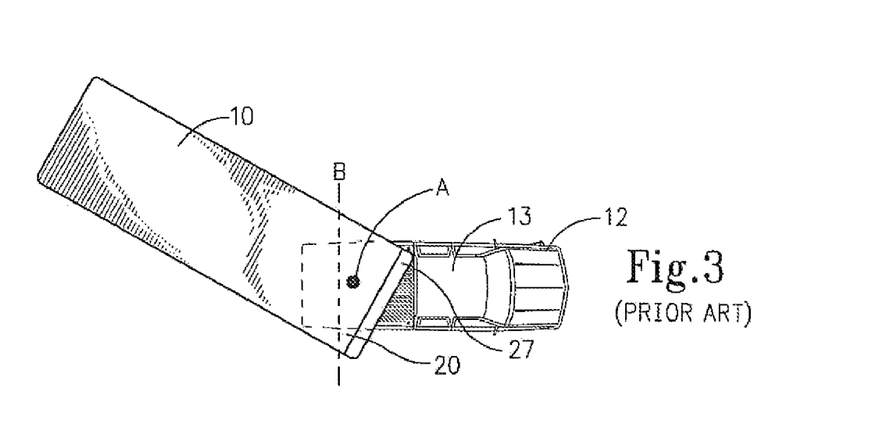
FIG. 3 is a top plan view of the truck and trailer combination of FIGS. 1 and 3 showing its reduced turning radius.

With reference now to FIGS. 2 and 3, a disadvantage of the prior art may now be appreciated where truck 12 is a short bed pick-up truck. Here, it may be seen that, in order to keep the hitch ball forward of the rear axle, so that axis "A" is forward of the rear axle, as is represented by transverse axis "B," results in diminished spacing between cab 13 of truck 12 and forward portion 20 of trailer 10. While towing trailer 10 in a straight line, as is shown in FIG. 2, this causes no problems. However, the turning radius of the combination of truck 12 and trailer 10 is diminished, as is shown in FIG. 3. When the vehicle is making a turn, the corner 27 of forward portion 20 can contact cab 13 which can result in damage to truck 12, trailer 10 or both. The present invention is directed to resolving this problem.

Figure 4:
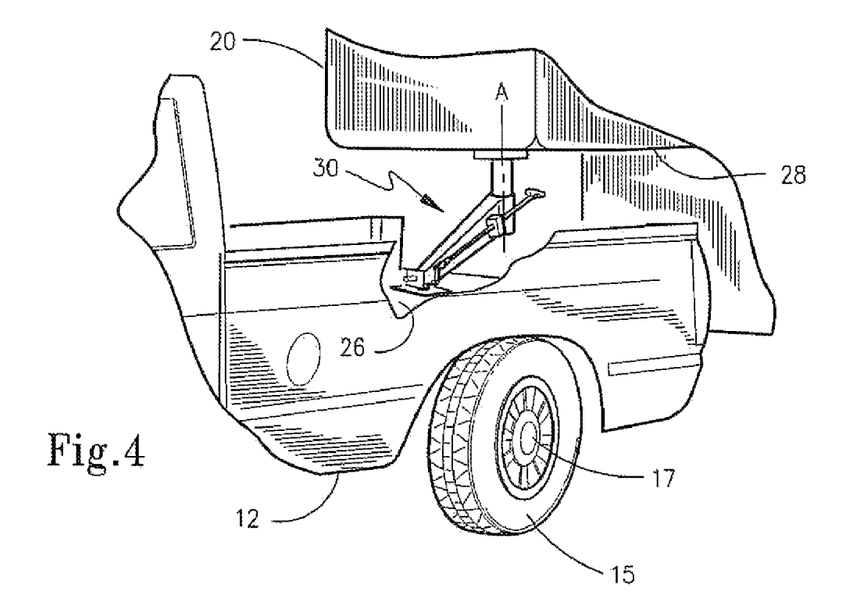
FIG. 4 is a partial perspective view showing the use of the hitch system according to the exemplary embodiment of the present invention with a truck and trailer combination.
Figure 5:
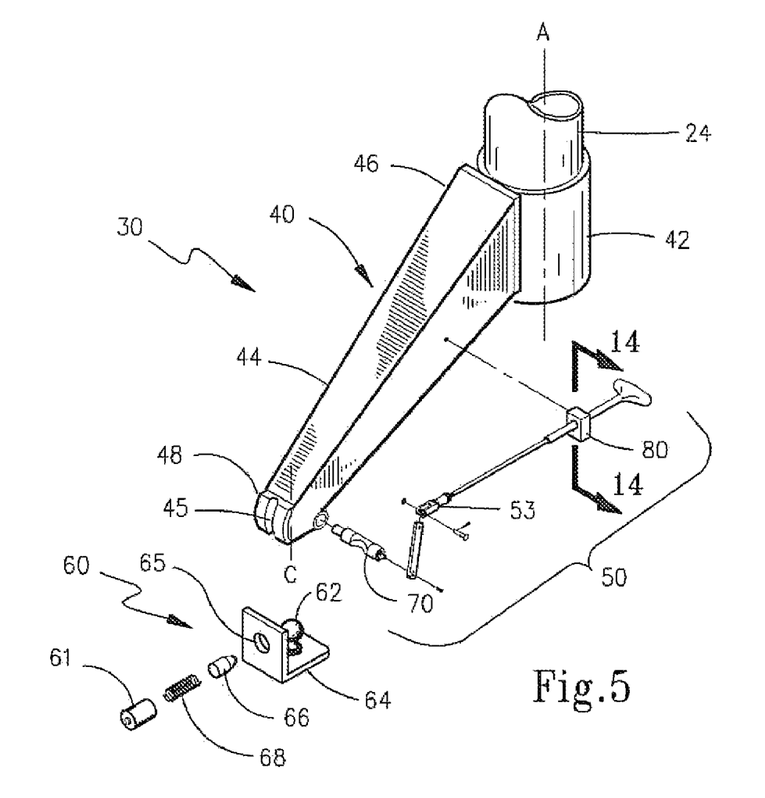
FIG. 5 is an exploded perspective view showing the assembly of the extension coupling and anti-yaw mounting assembly.

Hitch system 30 according to the exemplary embodiment of the present invention broadly includes an extension coupling 40 and anti-yaw mounting assembly 60. With reference to FIGS. 4 and 5, it may be seen that, by using hitch system 30, the forward weight of trailer 10 is supported by hitch ball 62 forward of rear axle 17 while at the same time extension coupling 40 acts to displace the position of trailer 10 rearward from hitch ball 62. This allows a greater clearance between cab 13 and front portion 20 so that the turning angle between truck 12 and trailer 10 may be increased without risking damage to either trailer 10 or cab portion 13. At the same time, trailer 10 may pivot during turning about downward extension axis "A" in a standard manner since extension coupling 40 does not pivot significantly with respect to hitch ball 62 due to anti-yaw mounting assembly 60, as described below.

Turning to FIG. 5, then, it may be seen that extension coupling 40 includes a mount 42 that is adapted to be rotatably secured to the trailer, such as to downward extension 24. Extension coupling 40 also includes an elongated arm 44, which has a proximal end portion 46 that is secured to mount 42 and a distal end portion 48 that is opposite proximal end portion 46. Distal end portion 48 includes a cavity 49 (see FIG. 10A) for receiving a hitch ball 62 of a standard type. Cavity 49 is adapted to releasably mate with the hitch ball 62 on the tow vehicle. Cavity 49 has a central axis "C". In use, axis "C" is generally vertical relative to the transport surface and generally parallel with axis "A". Distal end portion 48 includes slideway 45, which extends upwardly and arcuately to follow the contour of distal end portion 48.

Anti-yaw mounting assembly 60 includes restrictor 66 for engaging slideway 45 thereby preventing rotation about axis "C". Restrictor 66 may be supported by a restrictor mount, perhaps such as angle mount 64, which is captured between bed 26 of tow vehicle 12 and hitch ball 62. Restrictor 66, here in the form of a pin, extends through opening 65 and may even be resiliently biased toward hitch ball 62 by spring 68. Spring 68 is retained within cap 61 which may, for example, be threaded or welded to angle mount 64.

Hitch system 30 includes locking assembly 50 which is operatively connected to extension coupling 40 and movable between a locked state where extension coupling 40 can be securely coupled to hitch ball 62, and an unlocked state where extension coupling 48 can be selectively decoupled from hitch ball 62. Locking assembly 50 includes lock bar 70 which is rotatably disposed proximate cavity 49 and is operative to capture hitch ball 62 within cavity 49. Locking assembly 50 also includes a latch mechanism 80 that is movable to a latch state where the locking assembly is temporarily retained in the unlocked state. Latch mechanism 80 is adapted such that as the extension coupling 40 is decoupled from hitch ball 62, the hitch ball unlatches the latch mechanism 80 thereby allowing it to return to the unlatch state.

Figures 6, 7, 8, 9:
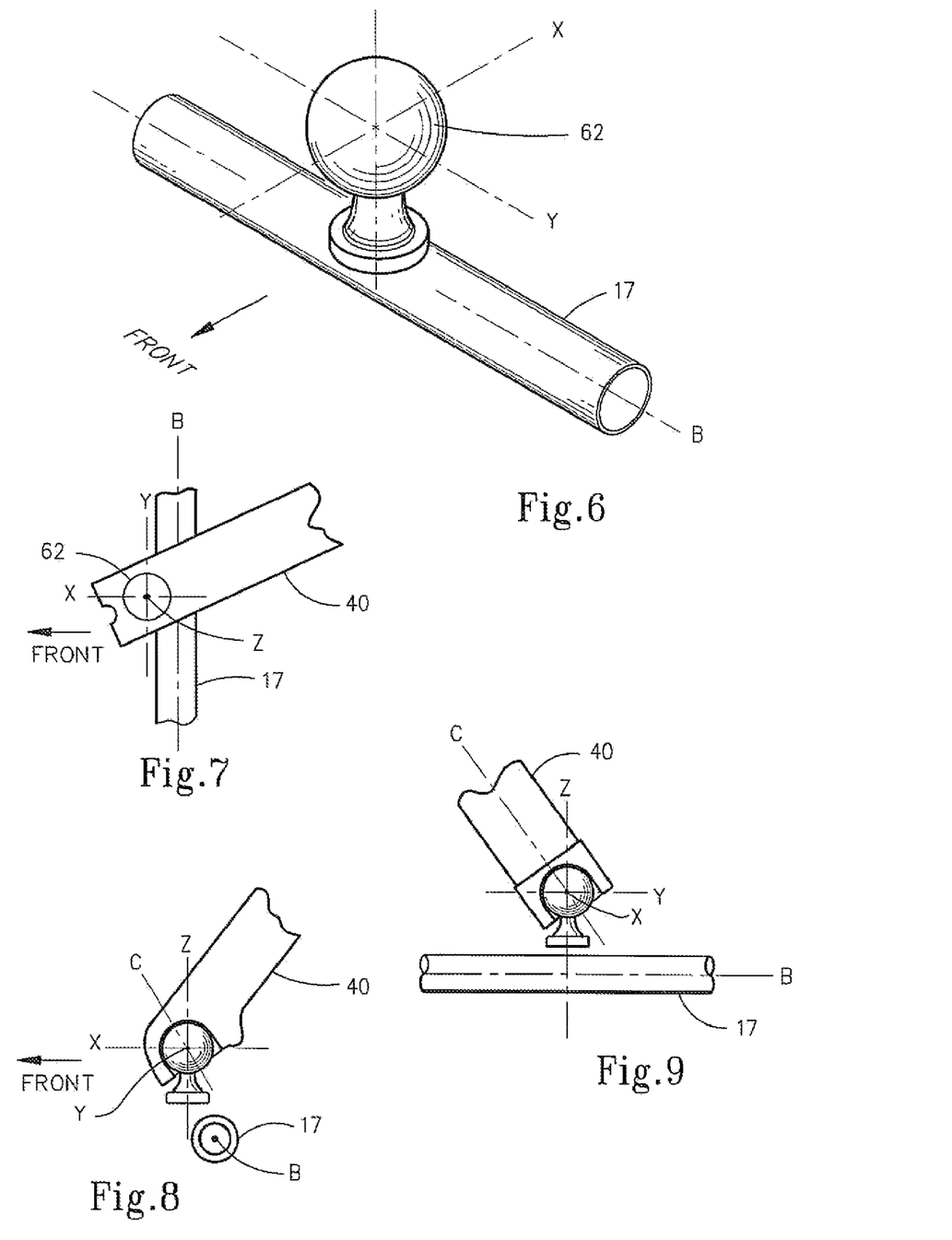
FIG. 6 is a perspective view of a hitch ball illustrating degrees of freedom about the hitch ball.
FIG. 7 is a partial top view of the extension coupling mated to and rotated in yaw about the hitch ball.
FIG. 8 is a partial side view of the extension coupling mated to and rotated in pitch about the hitch ball.
FIG. 9 is a partial front view of the extension coupling mated to and rotated in roll about the hitch ball.

FIG. 6 illustrates the three axes of rotation about which the extension coupling 40 may normally rotate relative to hitch ball 62. These axes are defined relative to the front of the tow vehicle. Tow vehicle axle 17, which extends along axis "B," is shown for reference. Roll axis "X" extends front to back relative to the vehicle, pitch axis "Y" extends laterally relative to the vehicle, and yaw axis "Z" extends along the medial axis of hitch ball 62.

FIG. 7 illustrates that in the absence of anti-yaw mounting assembly 60 that extension coupling 40 is allowed to rotate about yaw axis "Z." It should be understood that the hitch system 30 according to the exemplary embodiment restricts such rotation about axis "Z" and axis "C", as is more fully described below with reference to FIGS. 10A-10C.

FIG. 8 illustrates rotation of the extension coupling 40 about pitch axis "Y". Similarly, FIG. 9 illustrates rotation of the extension coupling 40 about roll axis "X'. It should be noted that in FIG. 7 the cavity central axis "C" is generally parallel with yaw axis "Z". However, in FIGS. 8 and 9 cavity axis "C" is rotated about the pitch and roll axes respectively. It can be seen then that rotation of the extension coupling 40 about hitch ball 62 is restricted about the "C" and "Z" axes even while the extension coupling is allowed to rotate about roll axis "X" and pitch axis "Y". This arrangement accommodates the situation where the trailer is pulled across an uneven surface, such as a driveway.

Figure 10A:
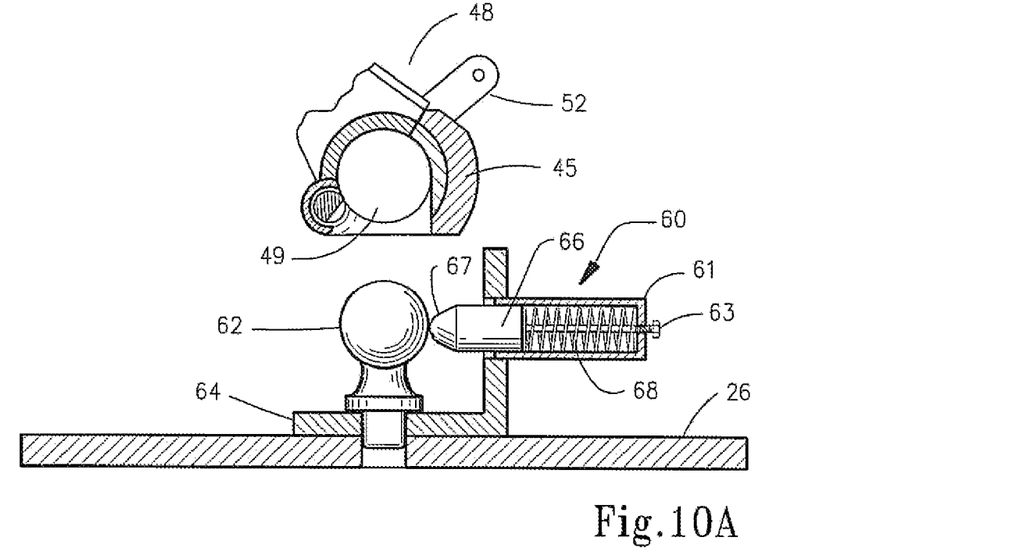
FIG. 10A is a side view in partial cross-section of the hitch system shown in a decoupled state.
Figure 10B:
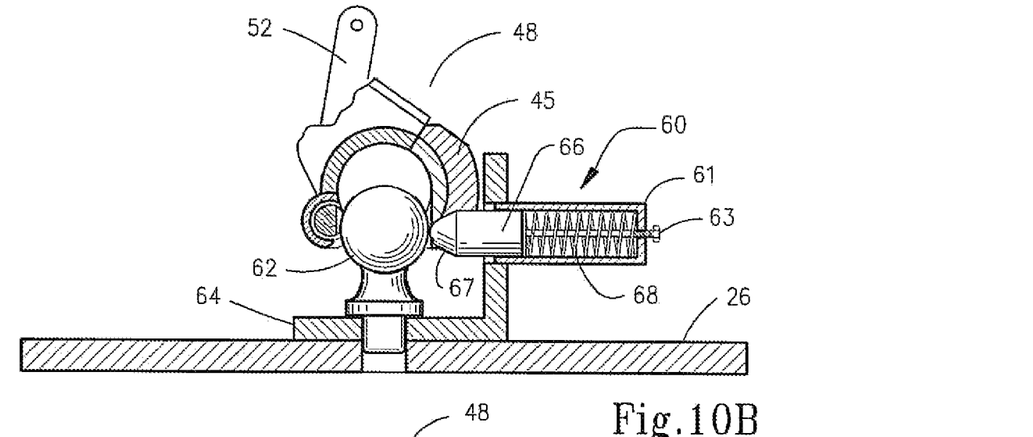
FIG. 10B is a side view in partial cross-section of the hitch system illustrating partial engagement between extension coupling and the anti-yaw mounting assembly.
Figure 10C:
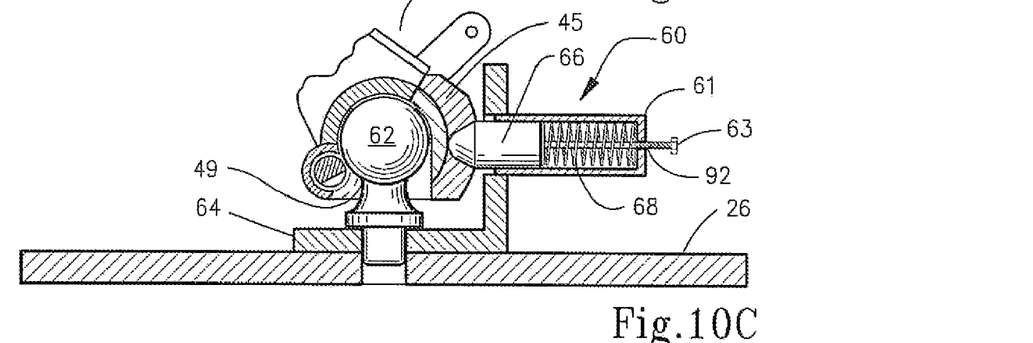
FIG. 10C is a side view in partial cross-section of the hitch system shown in a coupled state.

FIGS. 10A-10C illustrate the coupling of distal end portion 48 with hitch ball 62 and engagement of restrictor pins 66 with slideway 45. FIG. 10A illustrates the decoupled state where restrictor pin 66 is biased toward hitch ball 62. As distal end portion 48 approaches hitch ball 62, as shown in FIG. 10B, restrictor 66, having tapered end portion 67, is pushed away from hitch ball 62 as the contoured surface of slideway 45 engages restrictor 66. Once fully coupled, as shown in FIG. 10C, it should be appreciated, with reference again to FIGS. 6-9, that movement about yaw axis "Z" is restricted. Furthermore, movement about cavity central axis "C" is also restricted. Again, movement about axes "C" and "Z" is restricted while allowing distal end portion 48 to move about pitch axis "Y" and roll axis "X".

Figure 17:
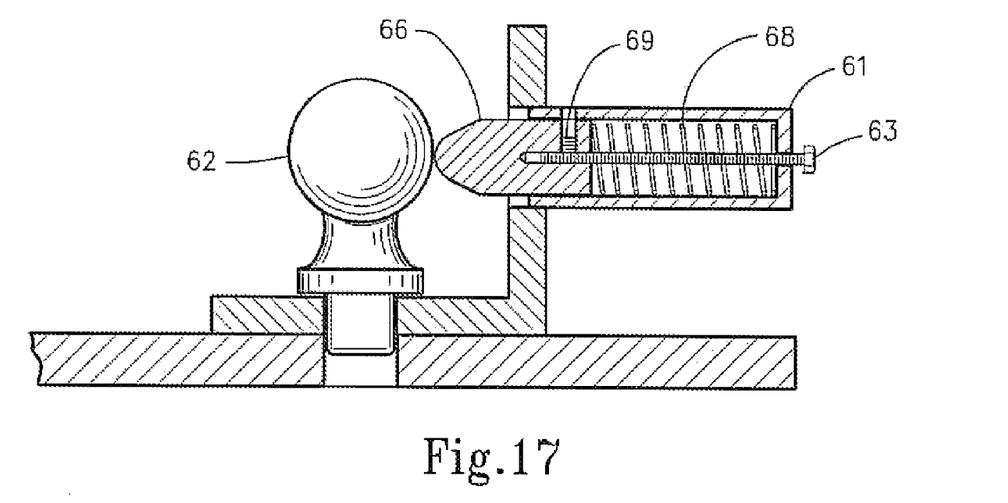
FIG. 17 is a partial side view in cross-section of the anti-yaw mounting assembly illustrating the assembly and adjustment of the restrictor.

Referring briefly to FIG. 17, it can be seen that restrictor 66 is biased toward hitch ball 62 by coil spring 68. Screw 63 retains restrictor 66 in cap 61. Screw 63 also provides for adjusting the position of restrictor 66 relative to hitch ball 62. Rotating screw 63 pulls restrictor 66 away from hitch ball 62 against bias spring 68. Once screw 63 is adjusted set-screw 69 may be tightened against screw 63 to retain it in its adjusted position. As can be seen in FIG. 10C, when restrictor 66 has engaged slideway 45 screw 63 extends beyond cap 61. The threaded portion 92 of screw 63 may be painted a suitable color, such as green, to indicate that restrictor 66 is fully engaged in slideway 45. Alternatively, a sleeve of a given color could be assembled to screw 63.

Figure 11:
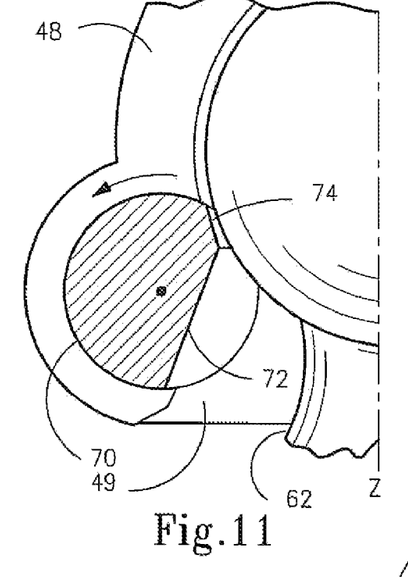
FIG. 11 is a side view in partial cross-section of the extension coupling mated to the hitch ball illustrating the lock bar.
Figure 12:
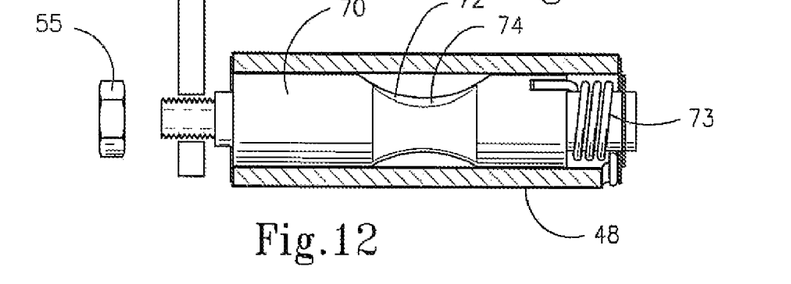
FIG. 12 is a front view in partial cross-section of the extension coupling showing the lock bar.

Once distal end portion 48 is coupled with hitch ball 62, the locking assembly 50 has moved to the locked state thereby securing the extension coupling 40 to hitch ball 62. Locking assembly 50 includes lock bar 70. As shown in FIGS. 11 and 12, lock bar 70 includes two adjacent cutouts 72 and 74. Cutout 72 is a cylindrical cut and cutout 74 is a spherical/cylindrical cut. Cutout 72 allows the hitch ball 62 to rotate the lock bar 70 counter-clockwise as ball 62 enters cavity 49. Once the ball 62 has fully entered cavity 49, torsion spring 73 (see FIG. 12) rotates lock bar 70 clockwise thereby locking hitch ball 62 in coupler cavity 49. As is described more fully below, cutout 74 provides a ramp surface whereby the hitch ball 62 causes lock bar 70 to rotate counterclockwise (see FIG. 11) to unlatch latch mechanism 80. It should be noted that cutout 74 is less deep than cutout 72. Also, cutout 74, in this construction, extends around the circumference of lock bar 70. This configuration may be preferable for manufacturing considerations. In this construction an external stop limits clockwise rotation of lock bar 70. The surface contact provided between hitch ball 62 and lock bar 70 in this arrangement is much greater than the point contact provided by existing hitches. A surface contact is preferable to help reduce wear between the hitch ball and lock bar.

As shown in FIG. 12, lock bar 70 is rotatably housed in the distal end portion 48. The locking assembly is biased towards the locked state. In this case, lock bar 70 is biased toward the locked state by torsion spring 73. Lock bar 70 may be moved against bias with arm 52, which is attached to lock bar 70 with nut 55.

Figure 13:
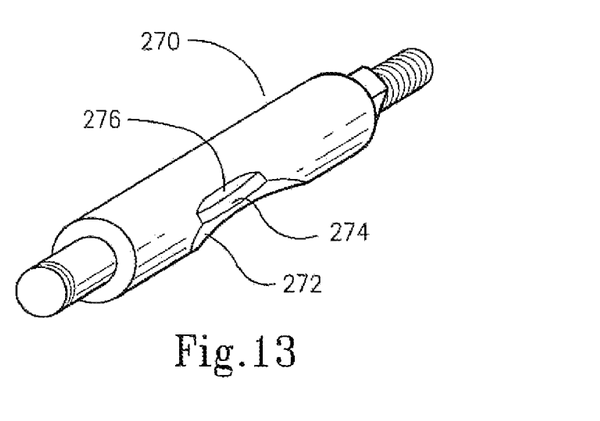
FIG. 13 is a perspective view of an alternate construction of the lock bar.

FIG. 13 illustrates an alternate construction of the lock bar. Lock bar 270 includes an additional cutout 276 located adjacent to spherical/cylindrical cutout 274. Cutout 276 has a spherical contour where cutout 272 is cylindrical and 274 is spherical/cylindrical. Preferably, the contour of cutout 276 matches the spherical contour of hitch ball 62. This construction of the lock bar 270, acts as a stop for rotation of the lock bar. The spherical shape of cutout 276 provides a much larger surface contact between ball 62 and lock bar 70, whereas others merely provide a point contact.

Figure 14:
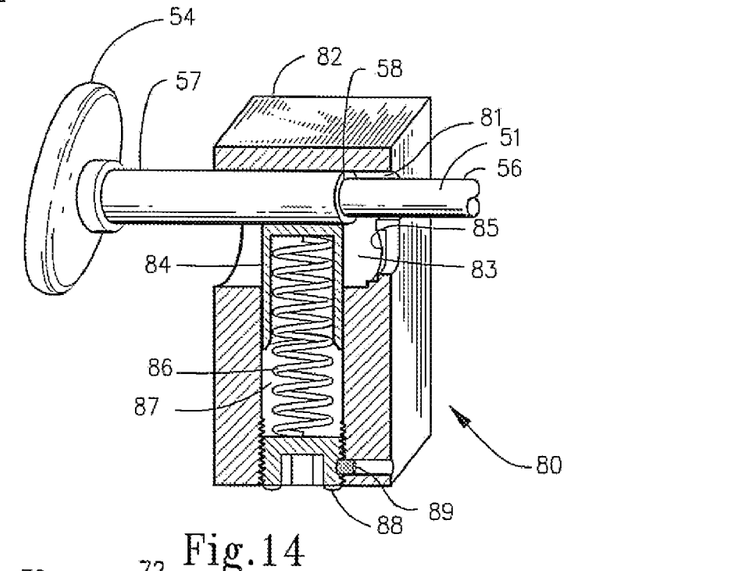
FIG. 14 is a perspective view in partial cross-section taken about line 14-14 in FIG. 5 showing the assembly of the latch mechanism.
Figure 15A:
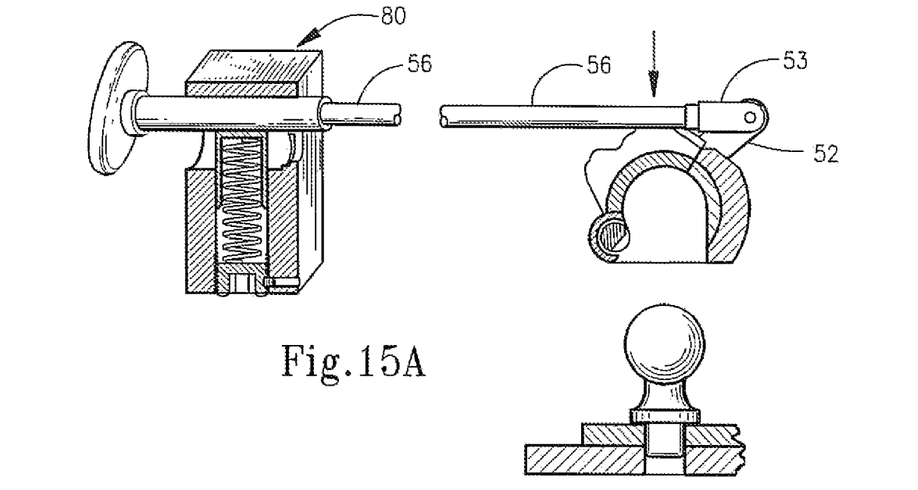
FIG. 15A is a side view in partial cross-section of the hitch system, including the latch mechanism, in a decoupled state illustrating the beginning of a coupling sequence.

Latch mechanism 80 is now described with initial reference to FIG. 14. Latch mechanism 80 includes a latch block 82. Bore 81 is formed through block 82 and is sized to slideably receive the larger diameter 57 of release rod 56. Extending parallel and intersecting with bore 81 is bore 83, which is sized to receive the smaller diameter 51 of release rod 56. Formed in the bottom of bore 83 is a counter-bored latch pocket 85 that is sized and adapted to receive shoulder 58. Bore 87 is formed transversely to bores 81 and 83 and is sized to receive plunger 84 and spring 86. Spring 86 acts to bias release rod 56 toward the unlatched state. Adjustment plug 88 is threaded into bore 87 and provides for adjustment of the biasing force applied to release rod 56. Set screw 89 secures plug 88 at the desired bias or spring tension adjustment. With reference to FIG. 15A it can be seen that release rod 56 is connected to arm 52 with clevis 53.

Figure 15B:
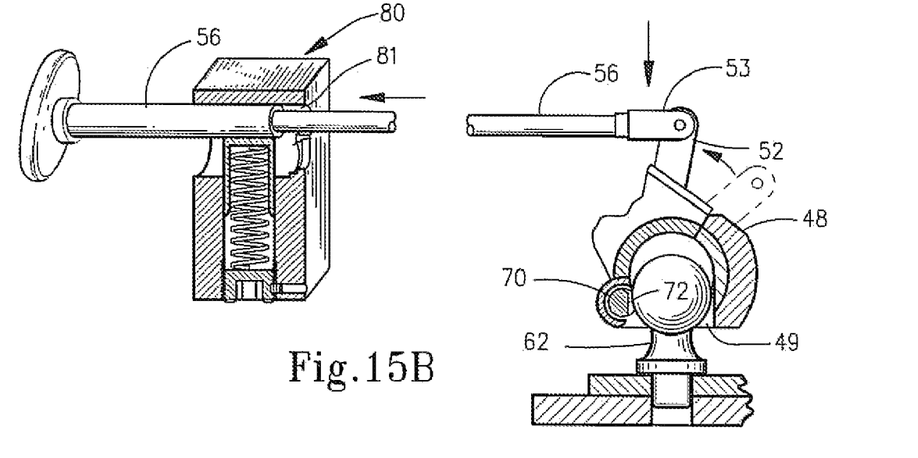
FIG. 15B is a side view in partial cross-section of the hitch system shown during a coupling sequence.
Figure 15C:
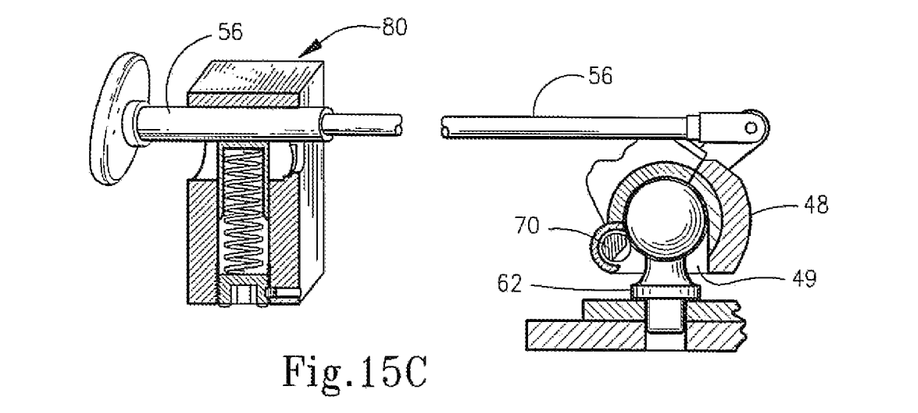
FIG. 15C is a side view in partial cross-section of the hitch system in a coupled state illustrating the conclusion of a coupling sequence.

Operation of the locking assembly during coupling of the extension coupling 40 to hitch ball 62 is now described with reference to FIGS. 15A-15C. FIG. 15A shows locking assembly 50 in the locked state and latch mechanism 80 is shown in the unlatched state. As shown in FIG. 15B, as distal end portion 48 is lowered onto hitch ball 62, the hitch ball enters cavity 49 and pushes against surface 72 of lock bar 70 (see FIG. 11), thereby forcing it to rotate counterclockwise. Arm 52 rotates with lock bar 70 and because arm 52 is connected to release rod 56 with clevis 53, release rod 56 slides in bore 81. However, because release rod 56 is biased toward the unlatched state it remains unlatched. With reference to FIG. 15C it can be appreciated that once distal end portion 48 has been completely lowered onto hitch ball 62, that lock bar 70 returns to the locked state. As described above lock bar 70 is biased toward the locked state, in this case, with torsion spring 73.

Figure 16A:
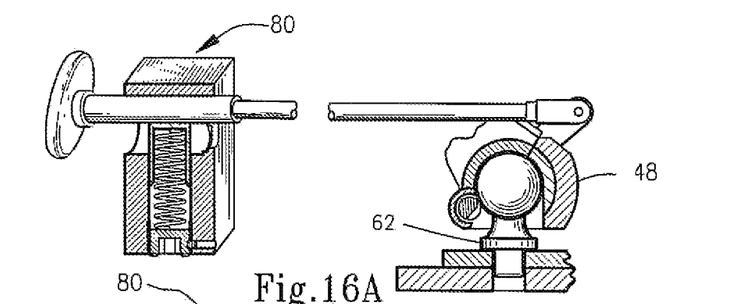
FIG. 16A is a side view in partial cross-section of the hitch system, including the latch mechanism, in a coupled state illustrating the beginning of a decoupling sequence.
Figure 16B:
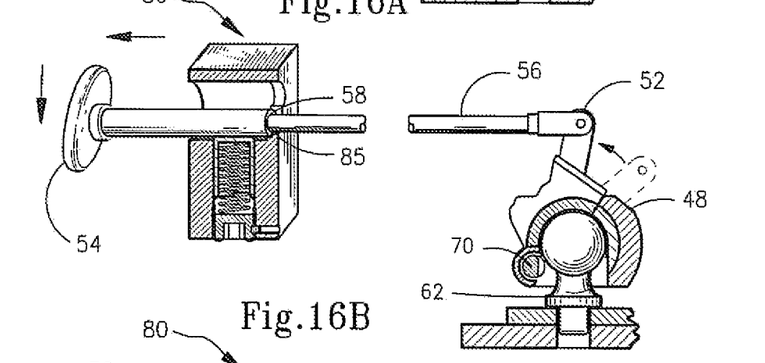
FIG. 16B is a side view in partial cross-section of the hitch system shown during a decoupling sequence where the latch mechanism is latched.
Figure 16C:
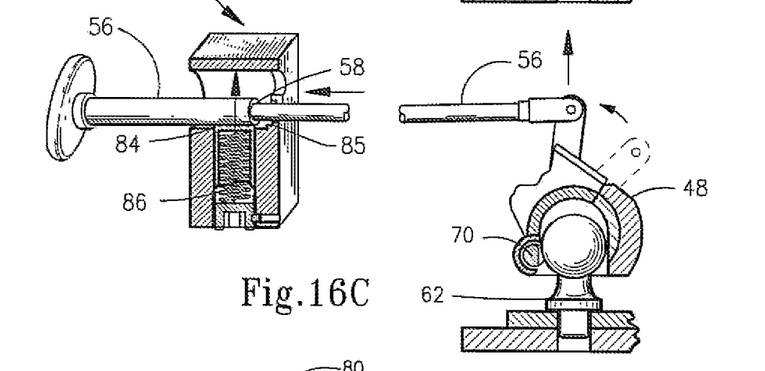
FIG. 16C is a side view in partial cross-section of the hitch system shown during a decoupling sequence where the latch mechanism is unlatching.
Figure 16D:
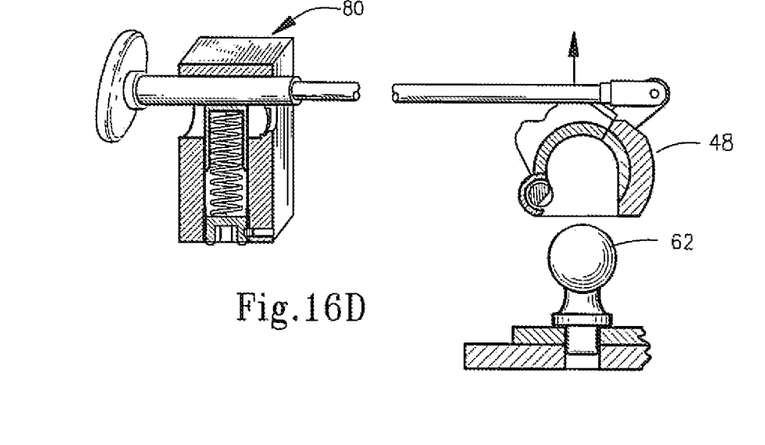
FIG. 16D is a side view in partial cross-section of the hitch system in a decoupled state illustrating the conclusion of a decoupling sequence.

Operation of the locking assembly during decoupling of the extension coupling 40 to hitch ball 62 is now described with reference to FIGS. 16A-16D. FIG. 16A shows the distal end portion 48 of extension coupling 40 fully coupled to hitch ball 62. Furthermore, locking assembly 50 is in the locked state and latch mechanism 80 is in the unlatched state. In preparation for decoupling distal end portion 48 from hitch ball 62 latch mechanism 80 is manually placed into the latched state. With reference to FIG. 16B, the latched state is described. In order to latch locking assembly 50 an operator manually pulls handle 54 back and down as the arrows in FIG. 16B indicate. As handle 54 is pulled back arm 52 is rotated thereby rotating lock bar 70 to the unlocked state. Handle 54 is pulled down against bias spring 86 and shoulder 58 comes to rest in latch pocket 85. Locking assembly 50 is now temporarily latched into the unlocked state. As shown in FIG. 16C, as distal end portion 48 is lifted off pitch ball 62, pitch ball 62 contacts surface 74 (see FIG. 11) thus forcing lock bar 70 to rotate counterclockwise. As lock bar 70 rotates counterclockwise release rod 56 moves backwards thus lifting shoulder 58 from latch pocket 85. As shoulder 58 clears latch pocket 85 bias spring 86 acting on plunger 84 forces release rod 56 upwards into the unlatched state. Finally, as shown in FIG. 16D, once distal end portion 48 is fully removed from hitch ball 62, locking assembly 50 returns to the locked state ready for re-coupling. Latch mechanism 80 allows a single operator to decouple the extension coupling from hitch ball 62. Because locking assembly 50 is always biased toward the locked state, latch mechanism 80 is necessary to temporarily unlock locking mechanism 50. However, for safety purposes latch mechanism 80 should automatically unlatch once the extension coupling is uncoupled, thereby reducing the likelihood that the next time the hitch is coupled the operator forgets to ensure that the locking assembly is in the lock state.

Figure 18:
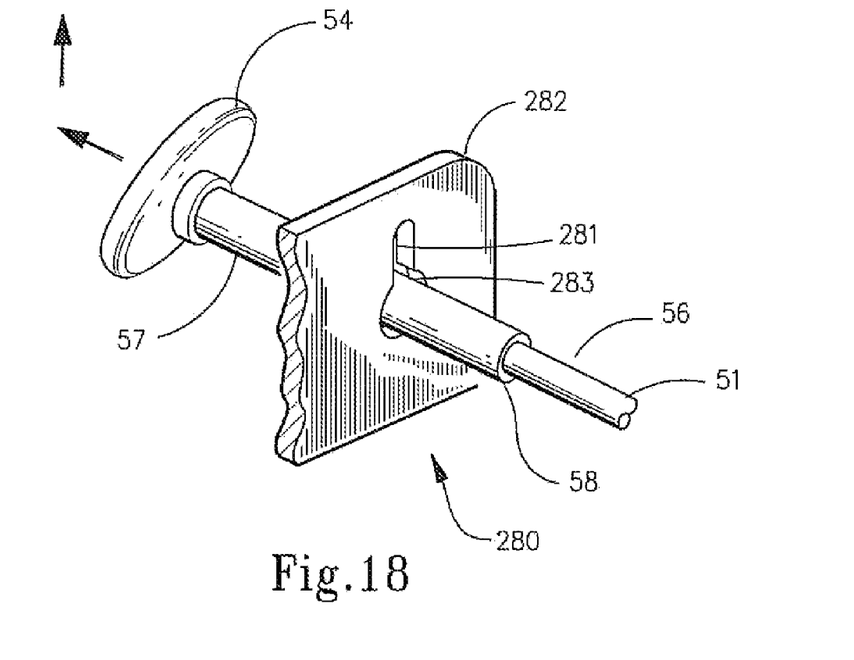
FIG. 18 is a partial perspective view of an alternative construction for the latch mechanism.

FIG. 18 illustrates an alternative construction of the latch mechanism. Latch mechanism 280 includes release rod 56 and a simplified latch block 282. Latch block 282 in this case has a key-hole shaped cutout comprising a large diameter 283 intersecting smaller diameter slot 281. Latch mechanism 280 is latched by pulling handle 54 until smaller diameter 51 of release rod 56 can be lifted into slot 281. The spring force applied by torsion spring 73 provides frictional resistance between shoulder 58 and latch block 282, thereby retaining the latch mechanism 280 in the latched state. Upon decoupling lock bar 70 rotates counterclockwise and release rod 56 moves backwards thus lifting shoulder 58 from latch block 282. Gravity pulls on release rod 56 causing it to drop into larger diameter 283, thereby allowing lock bar 70 to return to the locked state. Alternatively, latch mechanism 280 may be unlatched manually by pushing down on handle 54 to overcome the friction between shoulder 58 and latch block 282.

With the foregoing in mind, a method is also contemplated for interconnecting a trailer to a hitch ball where the trailer includes a downward extension having a central longitudinal axis interconnected to a hitch ball disposed in a bed of a tow vehicle, where the hitch ball is centered about a medial axis. The method broadly includes interconnecting the downward extension of the trailer to the hitch ball such that the central longitudinal axis is displaced rearwardly of the hitch ball and rotational movement of the downward extension about the medial axis is restricted while rotational movement of the downward extension about the central longitudinal axis is allowed.

Also contemplated is a method of interconnecting a trailer to the hitch ball of a tow vehicle including displacing a pivotal axis of the trailer rearward of the hitch ball, rotatably mounting a proximal end portion of an extension coupling to the pivotal axis of the trailer, and movably mounting a distal portion of the extension coupling to the hitch ball such that the rotational movement of the distal and portion about the hitch ball is restricted in a plane substantially perpendicular to the medial axis of the hitch ball.

Further, a method is also contemplated for decoupling a trailer from a hitch ball of a tow vehicle where the trailer includes a coupling having a locking assembly movable between a locked state wherein the trailer is securely coupled to the hitch ball, and an unlocked state wherein the trailer may be selectively decoupled from the hitch ball. The method broadly includes moving the locking assembly toward the unlocked state, latching the locking assembly in the unlocked state, removing the trailer coupling from the hitch ball, and unlatching said locking assembly.

Accordingly, the present invention has been described with some degree of particularity directed to the exemplary embodiment of the present invention. It should be recognized, however, that the present invention is defined by the following claims construed in light of the prior art so that modifications or changes may be made to the exemplary embodiment of the present invention without departing from the inventive concepts contained herein.

What is claimed is:

1. A hitch system for interconnecting a trailer to a tow vehicle, wherein the tow vehicle includes a hitch ball centered about a medial axis, said hitch system comprising:
   a. an elongate extension coupling having a proximal end portion rotatably mountable to the trailer and extending from said proximal end portion toward a distal end portion that is movably mountable to the hitch ball;

b. an anti-yaw mounting assembly at said distal end portion to restrict against rotating about the medial axis; and c. a pitch slideway on said anti-yaw mounting assembly at said distal end, wherein said pitch slideway allows vertical movement of said elongate extension coupling.

2. The hitch system according to claim 1 wherein said anti-yaw mounting assembly comprises a restrictor that engages said slideway when said distal end portion is mounted to the hitch ball.

3. The hitch system according to claim 2 wherein said slideway extends upwardly and wherein said restrictor extends transversely to the medial axis to restrict rotation of said distal end portion about the medial axis when mounted to the hitch ball.

4. The hitch system according to claim 3 wherein said restrictor extends perpendicular to the medial axis.

5. The hitch system according to claim 4 wherein said restrictor is resiliently biased towards the hitch ball.

6. The hitch system according to claim 5 wherein said slideway extends arcuately to follow a contour of said distal end portion.

7. The hitch system according to claim 6 wherein said distal end has a cavity to receive said hitch ball and said cavity has a vertical central axis and said anti-yaw mounting assembly is operative to restrict said distal end portion from rotating about the central axis of said cavity.

8. The hitch system according to claim 1 including a locking assembly operatively connected to said extension coupling and movable between a locked state wherein said extension coupling can be securely coupled to the hitch ball, and an unlocked state wherein said extension coupling may be selectively decoupled from the hitch ball.

9. The hitch system according to claim 8 wherein said locking assembly is biased toward the locked state.

10. The hitch system according to claim 8 wherein said locking assembly includes a latch mechanism movable between a latched state and an unlatched state.

11. The hitch system according to claim 10 wherein said latch mechanism is biased toward the unlatched state.

12. The hitch system according to claim 10 wherein said latch mechanism is operative in the latched state to temporarily retain said locking assembly in the unlocked state.

13. The hitch system according to claim 12 wherein said latch mechanism unlocks when said extension coupling is decoupled from the hitch ball by action of the hitch ball.

14. The hitch system according to claim 8 wherein said locking assembly is biased toward the locked state and comprises a latch mechanism biased towards an unlatched state and movable to a latched state wherein said latch mechanism is operative to temporarily retain said locking assembly in the unlocked state, and wherein said latch mechanism unlatches as said extension coupling is decoupled from the hitch ball, and allows return to the unlatched state.

15. The hitch system according to claim 4 wherein said restrictor comprises a pin.

* * * * *